United States Patent [19]

Fiedler

[11] 3,916,411

[45] Oct. 28, 1975

[54] ELECTRONIC DIRECTION FINDING APPARATUS

[76] Inventor: Guenter Fiedler, Fasanenweg 2, 2818 Syke, Germany

[22] Filed: July 31, 1973

[21] Appl. No.: 384,333

[30] Foreign Application Priority Data

Aug. 1, 1972 Germany.............................. 2237720

[52] U.S. Cl.................................. 343/121; 343/123
[51] Int. Cl.² ........................................... G01S 5/04
[58] Field of Search............................ 343/121, 123

[56] References Cited
UNITED STATES PATENTS

| | | | |
|---|---|---|---|
| 2,943,323 | 6/1970 | Ryan..................................... | 343/121 |
| 3,156,916 | 11/1964 | Byatt.................................... | 343/121 |
| 3,553,699 | 1/1971 | Starkey et al....................... | 343/121 |

FOREIGN PATENTS OR APPLICATIONS 968,863   3/1958   Germany

*Primary Examiner*—Maynard R. Wilbur
*Assistant Examiner*—G. E. Montone
*Attorney, Agent, or Firm*—Allison C. Collard

[57] ABSTRACT

An electronic direction finding apparatus, in which the radio-frequency field of the transmitter on which a bearing is to be taken is measured with a stationary direction finding antenna combination having two directional outputs, with mutually perpendicular directional sensitivity patterns, and a third output with omnidirectional sensitivity, and in which the directional antenna output signals, being proportional to the sine or cosine of the angle of incidence, are each modulated with a specific identifying low frequency and sorted, after passing amplifiers and a demodulator in a receiver, and evaluated according to their relative strengths and polarities. The non-modulated omnidirectional antenna output signal is fed directly into the same receiver in a suitable phase position in relation to the modulated directional antenna output signals, and through vector formation, a definite bearing indication is obtained from the demodulated and sorted directional modulation components, by referencing the latter to the specific identifying low-frequency oscillations.

5 Claims, 5 Drawing Figures

ELECTRONIC DIRECTION FINDING APPARATUS

This invention relates to an electronic radio direction finding (RDF) apparatus in which the radio-frequency field of a transmitter, on which a bearing is to be taken, is measured with a stationary direction finding antenna combination having two outputs with mutually perpendicular sensitivity patterns and a third output with omnidirectional sensitivity, and in which the directional antenna output signals, being proportional to the sine or cosine of the relative bearing, are each modulated with a specific identifying low frequency and are sorted after passing amplifiers and a demodulator in a receiver and are evaluated according to their relative strengths and polarities.

In conventional RDF systems such as according to German Pat. No. 968,863, a considerable technical effort is required for the modulation of all signals, including the omnidirectional signal, and for the evaluation of the demodulated directional components, especially since special measures have to be taken so as not to lose the phase synchronization necessary for a vector formation.

It is therefore the primary object of the present invention to provide a radio direction finding apparatus which reduces the number of low-frequency channels required for a definite bearing determination, the means required for the vector formation, and the possibility of errors associated therewith.

According to the invention this object is reached by feeding the non-modulated omnidirectional antenna signal, in a suitable phase position relative to the modulated directional antenna signals, directly into the receiver, and by forming vector components from the demodulated and sorted directional components while taking them in reference with the specific identifying low-frequency oscillations, and by obtaining definite bearing indication through adding the vector components and displaying the resultant vector.

In a first embodiment of the radio direction finder apparatus, a low-frequency oscillator generates two oscillations with different frequencies. While the first oscillation is used for the modulation of a first directional antenna output, the low frequency used to modulate the second directional antenna output signal is derived from the two generated frequencies in a converter. At the output of the receiver the demodulated directional components are identified by the respective low frequencies and sorted. The first component is fed directly into a first vector-component output amplifier, while the second component is first converted in an additional converter to the frequency of the first low-frequency component, with the aid of the generated second low frequency, and then it is fed into a second vector-component output amplifier. The so formed low-frequency components are added and the resultant vector is displayed by a standard vector indicator for alternating-current components.

In a second embodiment, the low-frequency oscillator directly generates both low-frequency oscillations used for the modulators. The demodulated and sorted directional components are rectified in a pair of phase detectors which are controlled by the respective modulating oscillations. The so formed direct-current vector components are fed to a standard direct-current vector indicator via a pair of DC vector-component output amplifiers.

In a third embodiment of the apparatus according to the invention, the modulators for modulating the directional antenna output signals are replaced by electronically controlled switches, which are cross-over switched at the rates of the respective identifying low frequencies.

In another embodiment of the invention, a variable, either low-frequency or direct-current, attenuator is inserted between the sorting means and the vector indicator, to compensate for quandrantal errors by a simple mutual adjustment of the gains in the two directional component channels.

It is therefore the main object according to the present invention to provide a radio direction finding apparatus which is simple in design and reliable in operation.

Other objects and features of the present invention will become apparent from the following detailed description when considered in connection with the accompanying drawings which disclose the several embodiments of the invention. It is to be understood that the drawings are designed for the purpose of illustration only and not as a definition of the limits of the invention.

In the drawings, wherein similar reference characters denote similar elements throughout the several views:

FIG. 1 ia a simplified electrical block diagram applicable to all embodiments of the radio direction finding apparatus according to the invention;

Figure 1:
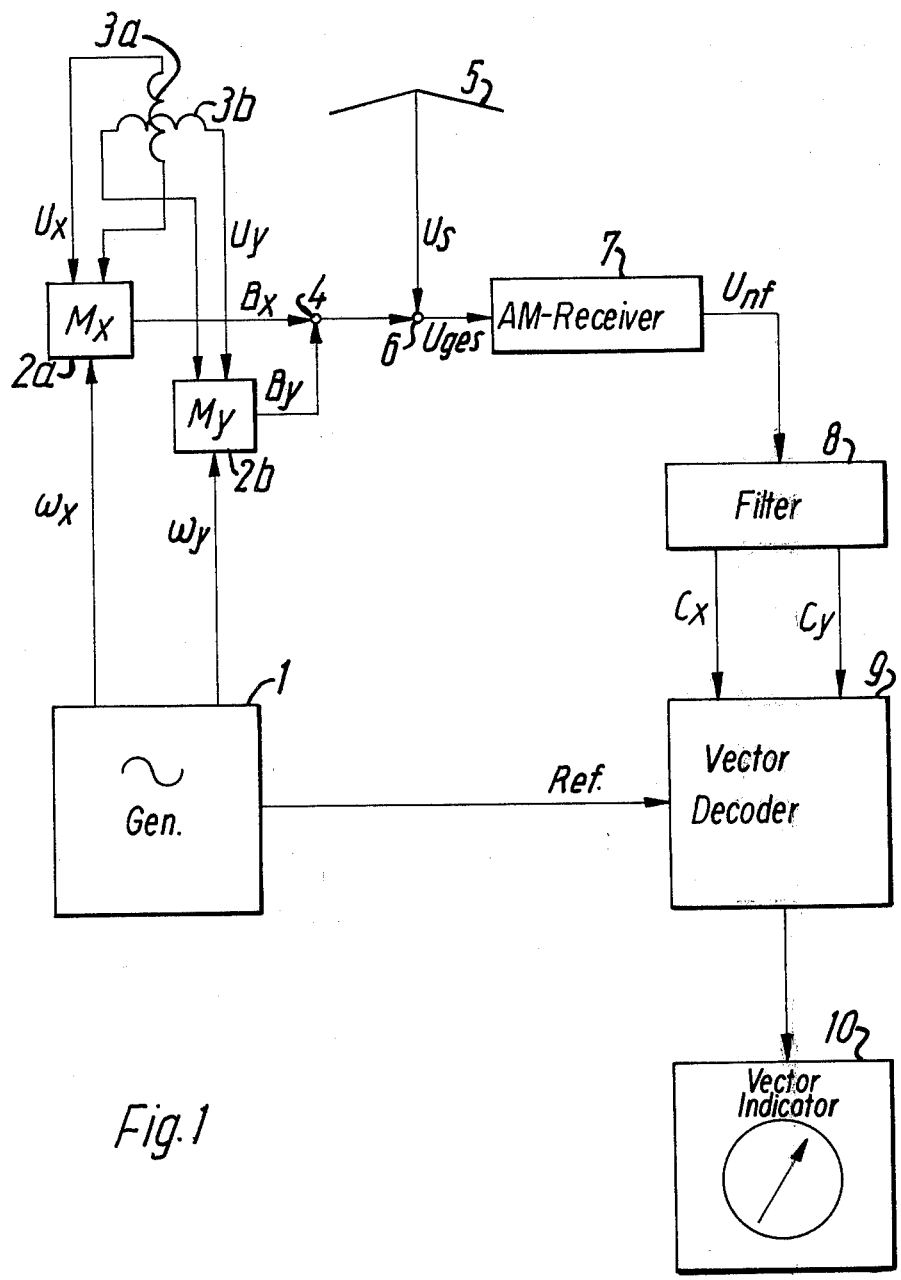

A stationary direction finding antenna combination of FIG. 1 measures with its two directional antenna systems 3a and 3b, arranged with their directional sensitivity patterns perpendicular to each other, the incoming radio-frequency field of the transmitter on which bearing is to be taken, in two directional components X and Y. The antenna combination supplies a balanced X modulator 2a with an X-directional antenna output signal $U_x$ and a balanced Y modulator 2b with a Y-directional antenna output signal $U_y$.

If $\alpha$ is the wave angle of incidence and $\Omega$ is the radian frequency of the received high frequency signal, then the measured directional antenna output signals are:

$$U_x = K_x \cdot \sin(\Omega\, t + 90°) \cdot \cos\alpha \text{ and}$$

$$U_y = K_y \cdot \sin(\Omega\, t + 90°) \cdot \sin\alpha$$

in which $K_x$ and $K_y$ are scale factors which, e.g., express respective antenna sensitivity figures.

Moreover, modulators 2a and 2b receive at their inputs low-frequency A.C. control voltages $A_x$ and $A_y$ from a low-frequency oscillator 1 which generates two low-frequency oscillations $\omega_x$ and $\omega_y$. These control voltages have the following course in time:

$$A_x = U_m \cdot \sin \omega_x t; \text{ and}$$
$$A_y = U_m \cdot \sin \omega_x t.$$

Modulators 2a and 2b are linear balanced modulators with gains of $V_x$ and $V_y$, so that their output products have the general form of $$B_x = V_x \cdot U_x \cdot A_x \text{ and}$$
$$B_y = V_y \cdot U_y \cdot A_y$$

If now the magnitudes are filled in, then the following modulation products emerge:

$$B_x = V_x \cdot K_x \cdot \sin(\Omega t + 90°) \cdot \cos \alpha \cdot U_m \cdot \sin \omega_x t; \text{ and}$$
$$B_y = V_y \cdot K_y \cdot \sin(\Omega t + 90°) \cdot \sin \alpha \cdot U_m \cdot \sin \omega_y t$$

If it is now first of all assumed that there is no quadrantal error, then:

$$V_x \cdot K_x \cdot U_m = V_y \cdot K_y \cdot U_m = U_l$$

and the sum of the modulated directional output signals becomes, e.g., at a connecting point 4:

$$B_x + B_y = U_l \cdot \sin(\Omega t + 90°) \cdot (\sin \omega_x t \cdot \cos \alpha + \sin \omega_y t \cdot \sin \alpha)$$

When to this, after eliminating the 90° radio-frequency phase difference, the omnidirectional antenna output signal $U_s = U_s \sin \Omega t$ of omnidirectional antenna system 5 is added, then the total signal present at a point 6 is for a receiver 7:

$$U_{tot} = U_s \sin\Omega t + U_l \sin\Omega t \cdot (\sin \omega_x t \cdot \cos\alpha + \sin \omega_y t \cdot \sin\alpha)$$
$$U_{tot} = U_s \sin\Omega t \cdot [1 + U_l/U_s \cdot (\sin \omega_x t \cdot \cos\alpha + \sin\omega_y t \cdot \sin\alpha)]$$

The total receiver input signal is therefore an amplitude-modulated radio-frequency oscillation, modulated by two different low-frequency identifying oscillations $\omega_x$ and $\omega_y$, with a carrier amplitude $U_s$ and a maximum depth of complex modulation degree of $m_{max} = 1.415 \cdot U_l/U_s$, which occurs when the wave angle of incidence $\alpha$ lies approximately in the center of a quadrant.

The total signal $U_{tot}$ is amplified in the receiver 7 and demodulated. The demodulated direction finding video signal, present at the output of the receiver 7, is:

$$U_{nf} = U_{vid} \cdot (\sin \omega_x t \cdot \cos \alpha + \sin \omega_y t \cdot \sin \alpha).$$

In a filter network 8 the frequencies of $\omega_x$ and $\omega_y$ are separated from each other, so that two low frequency oscillations $C_x$ and $C_y$ are formed:

$$C_x = U_{vid} \cdot \sin \omega_x t \cdot \cos \alpha \text{ and}$$
$$C_y = U_{vid} \cdot \sin \omega_y t \cdot \sin \alpha.$$

These demodulated and sorted directional components $C_x$ and $C_y$ contain the values $\sin \alpha$ and $\cos \alpha$, which, when both given, permit the formation of a vector in any direction of $\alpha$. Each of the two directional components has within an $\alpha$ angle sweep of 360° two maximum and two zero-amplitude positions and reverses in low-frequency phase with reference to the respective modulating and identifying oscillation $\omega_x$ respective $\omega_y$, when $\alpha$ goes through the respective zero-amplitude directions. To give an azimuthal reference example, 0° can be the direction dead ahead of a vehicle carrying the radio direction finder, or some other reference direction, e.g., true or magnetic North in case of a fixed land RDF station. For $C_x$ the zero or minimum amplitude positions lie at 90° and 270°, whilst $C_y$ has its minimum amplitude positions at 0° and 180°.

A vector decoder 9 forms, depending on the embodiment, two alternating current signals of the same frequency or two direct-current signals, serving as vector components for an indication in a vector indicator 10.

Figure 2:
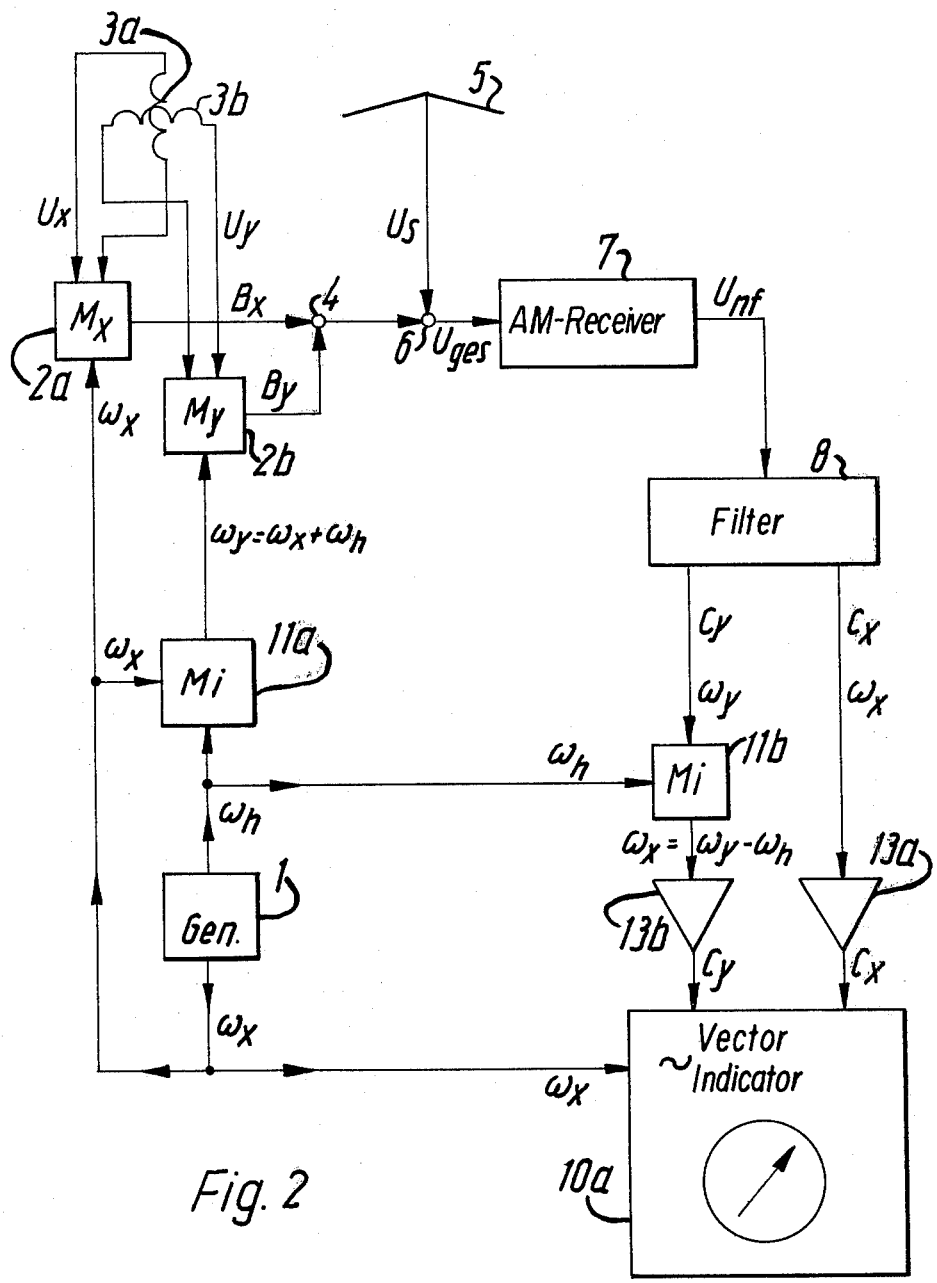
FIG. 2 is a more detailed electrical block diagram of a first embodiment of the apparatus according to the invention.

If, as in the first embodiment of the radio direction finder according to the invention (see FIG. 2) the bearing is to be indicated by an alternating-current vector indicator 10a, then it is necessary to convert the alternating-current vector components to the same low frequency. In principle it is possible to convert both components and the reference oscillation but from an economical point of view it is preferred to convert only one component and to use the modulating oscillation of the other component as a reference oscillation and its frequency as a common vector-component frequency.

Thus in the first embodiment the component $C_x$ is led directly to the alternating-current vector indicator 10a, via a first AC vector component output amplifier, whilst the component $C_y$ is first converted in a converter 11b with the aid of an auxiliary frequency $\omega_h$ to the frequency of $\omega_x$ and then fed to the vector indicator 10a via a second AC vector component output amplifier 13b.

On the other hand, the modulation frequency $\omega_y$ is formed, in a similar converter 11a, from frequencies $\omega_x$ and $\omega_h$ which are both generated in the low frequency oscillator 1. It can be shown that oscillation $C_y'$, obtained in the converter 11b, because of being twice mixed with the oscillation $\omega_h$, has not only the same frequency as $C_x$, but also shows a fixed phase relationship to $C_x$, so that a vector formation from the values $\vec{C_x}$ and $\vec{C_y}'$ is possible:

$$\vec{V} = \vec{C_x} + \vec{C_y}' = \vec{V^j} \alpha$$

Moreover, $$V = \sqrt{(C_x)^2 + (C_y')^2} \text{ and}$$
$$\alpha = \arctan(C_y'/C_x)$$

wherein the magnitude $V$ of the resultant vector $\vec{V}$ is only of importance in so far as it must lie within certain limits depending on the type of vector indicator used. This requirement is most probably assured by the automatic gain control of the receiver 7. The mathematical ambiguity of the mere tangent expression $\alpha = \arctan C_y'/C_x$, due to the effect of the respective polarities of $C_x$ and $C_y'$ does not affect the indication. For AC vector indicators, it is possible to use $\omega_x$-energized synchro-torque receiving elements, or cathode-ray tubes intensity controlled with the identifying oscillation $\omega_x$.

If the bearing $\alpha$, as in the second embodiment of the apparatus according to the invention (see FIG. 3), is intended to be indicated by direct-current vector indicator 10b, then two direct-current components $D_x$ and $D_y$ are required which, according to the sine and cosine functions of the same angle $\alpha$ can have different magnitudes and polarities. These components are derived in a pair of phase detectors 14a and 14b which phase-sensitively rectify the alternating-current components $C_x$ and $C_y$ with reference to the respective modulating oscillations $\omega_x$, $\omega_y$.

The vector component addition is effected in the DC vector indicator 10b by the phase-detected components $D_x$ and $D_y$ after passing DC vector component output amplifiers 15a and 15b.

As DC vector indicators one can use, in a known manner, DC-energized synchro-torque receiving elements, as mentioned before, or rotating-field indicators having permanent-magnet rotors, or cathode-ray tubes.

It is known that linear balanced modulators as for units 2a and 2b must be very carefully designed and expensively constructed when high demands are made on the accuracy of the bearings, especially in the centers of the quadrants and that it is considerably simpler and less critical to switch the radio-frequency signals over instead of modulating them. The only essential thing in a switch operation is whether the constant and rectangular-shaped modulation arising from the operation can be used in the radio direction finder in question. This is in fact the case with the radio direction finder apparatus according to the invention.

Figure 4:
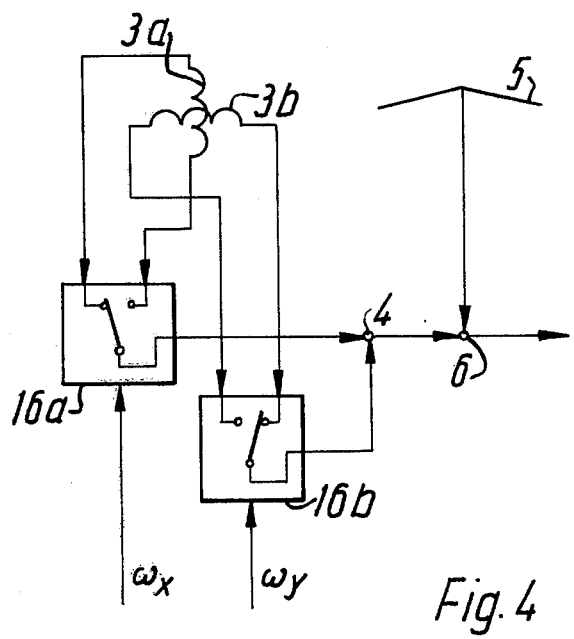
FIG. 4 illustrates the basic function of electronically controlled switches replacing modulators in a third embodiment.

In the third embodiment (see FIG. 4) the balanced modulators 2a and 2b have therefore been replaced by electronically controlled cross-over switches 16a and 16b. The demodulated low-frequency directional components present at the output of the receiver are then square-wave signals; their harmonic contents however do not disturb the directional components selected with the filter network 8.

Figure 3:
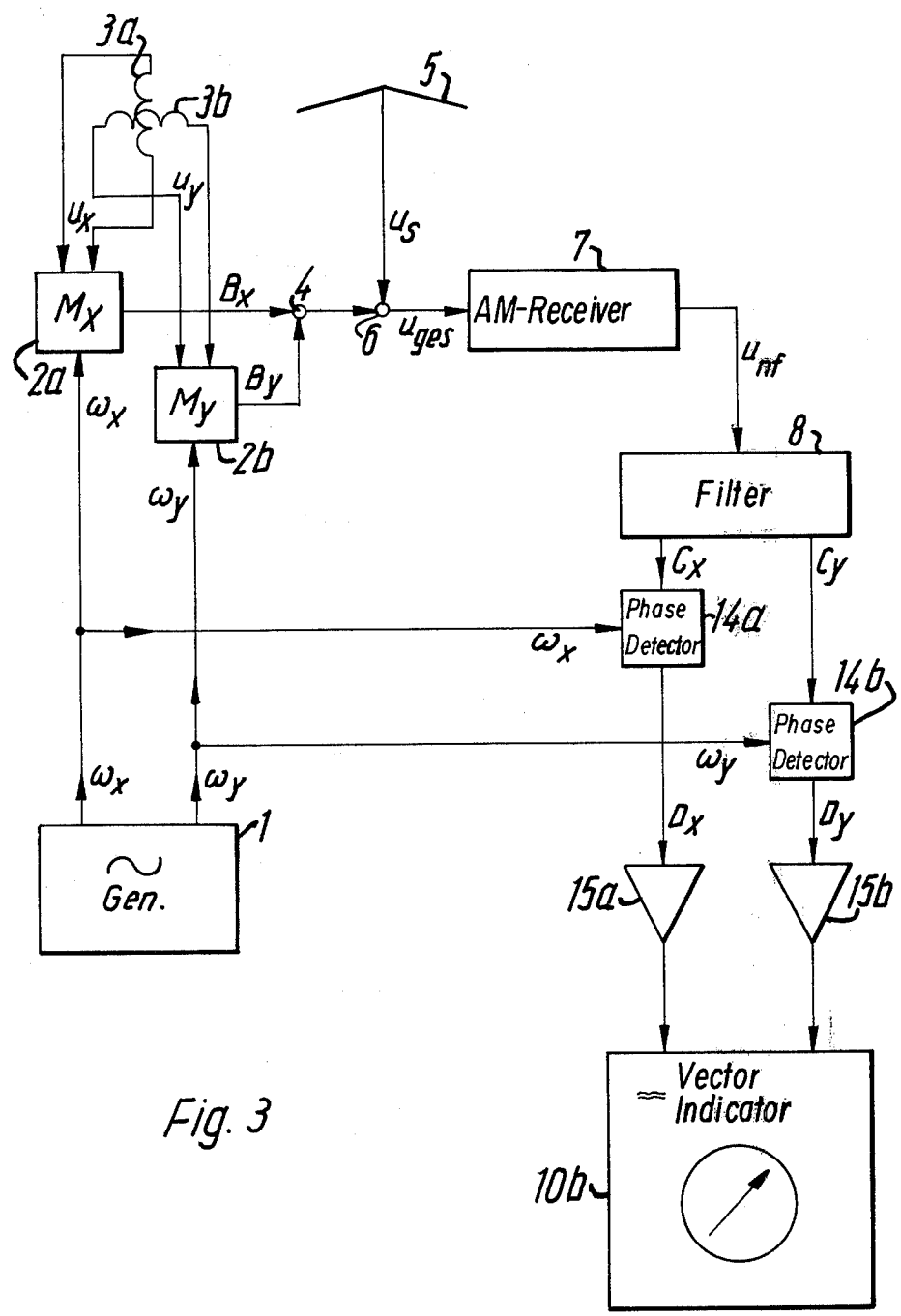
FIG. 3 is a more detailed electrical block diagram of a second embodiment of the radio direction finding apparatus.
Figure 5:
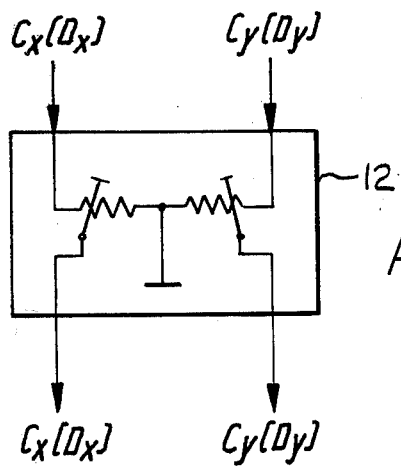
FIG. 5 discloses a variable attenuation network insertable into the AC or DC channels of yet a further embodiment of the inventive apparatus.

In a fourth embodiment of the apparatus according to the invention (see FIG. 5), an adjustable attenuation network 12 is placed between the filter network 8 and the vector indicator (10a, 10b). This network allows for the compensation of the quadrantal error possible in a known manner. The attenuation network consists in its simplest form of a variable voltage divider, and can be inserted into the alternating current component channels of the first embodiment (FIG. 2) as well as into the AC or DC component channels of the second (FIG. 3).

While only a few embodiments of the present invention have been shown and described, it will be obvious that many changes and modifications may be made thereunto without departing from the spirit and scope of the invention.

What is claimed is:

1. An electronic radio direction finding apparatus for measuring the bearing of a remote transmitter radiating radio-frequency waves, comprising, in combination: a stationary radio direction finding antenna combination for receiving the waves radiated by the remote transmitter and having two outputs of mutually perpendicular directional sensitivity patterns and a third output with omnidirectional sensitivity; means for separately modulating the signals of said directional antenna outputs, being respectively proportional to the sine and the cosine of the bearing angle, each with a specific low frequency; a receiver combining at its input the modulated directional antenna output signals and the non-modulated signal of said omnidirectional antenna output, and simultaneously demodulating the directional components; means for separating the demodulated directional components; means for forming vector components from the separated directional modulation components by making use of the specific low-frequency signals as references; and means for adding the vector components and displaying a vector which definitely represents the bearing of the remote transmitter.

2. The apparatus as defined in claim 1, wherein said means for modulating the directional antenna output signals is in the form of electronically controlled cross-over switches operating at the rates of the specific low-frequency oscillations.

3. The apparatus as defined in claim 1, wherein said vector forming means includes means for converting at least one of the directional modulation components to a common frequency, and said adding and display means includes a vector indicator for alternating-current vector components.

4. The apparatus as defined in claim 1, wherein said vector forming means includes phase detectors for rectifying the directional modulation components, and said adding and display means includes a vector indicator for direct-current vector components.

5. The apparatus as defined in claim 1, further comprising means for eliminating quadrantal errors by mutually adjusting the gains of the respective low-frequency AC and DC component channels.

* * * * *